United States Patent
Hirata et al.

(10) Patent No.: US 8,508,697 B2
(45) Date of Patent: Aug. 13, 2013

(54) METHOD FOR MANUFACTURING A LIQUID CRYSTAL DISPLAY INCLUDING A LIQUID CRYSTAL DISPLAY PANEL TURNING OPERATION

(75) Inventors: Satoshi Hirata, Ibaraki (JP); Seiji Kondou, Ibaraki (JP); Kazuya Hada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/022,977

(22) Filed: Feb. 8, 2011

(65) Prior Publication Data

US 2012/0071058 A1    Mar. 22, 2012

(30) Foreign Application Priority Data

Sep. 17, 2010   (JP) ................................ 2010-209803

(51) Int. Cl.
    *G02F 1/1335*     (2006.01)
    *G02F 1/13*     (2006.01)

(52) U.S. Cl.
    USPC ............................................ 349/96; 349/187

(58) Field of Classification Search
    USPC .................................................... 349/96, 187
    See application file for complete search history.

(56) References Cited

U.S. PATENT DOCUMENTS

| | | |
|---|---|---|
| 2004/0241344 A1 | 12/2004 | Kawanishi et al. |
| 2005/0016670 A1 | 1/2005 | Kanbara et al. |
| 2006/0124248 A1 | 6/2006 | Kanbara et al. |
| 2009/0218049 A1 | 9/2009 | Kanbara et al. |
| 2009/0263608 A1* | 10/2009 | Kitada et al. ................. 428/41.8 |
| 2010/0186890 A1 | 7/2010 | Kitada et al. |
| 2010/0206977 A1 | 8/2010 | Kitada et al. |
| 2010/0212822 A1 | 8/2010 | Kitada et al. |
| 2010/0258250 A1 | 10/2010 | Kitada et al. |
| 2010/0282406 A1 | 11/2010 | Kitada et al. |
| 2010/0300606 A1 | 12/2010 | Kitada et al. |
| 2011/0104423 A1* | 5/2011 | Kitada et al. ................. 428/41.8 |
| 2011/0126988 A1 | 6/2011 | Kitada et al. |

FOREIGN PATENT DOCUMENTS

| | | | |
|---|---|---|---|
| CN | 285-4642 | * | 7/2005 |
| CN | 2854642 Y | | 1/2007 |
| EP | 2 302 444 A1 | | 3/2011 |
| EP | 2309313 A1 | | 4/2011 |

(Continued)

OTHER PUBLICATIONS

Korean Office Action dated May 25, 2011, issued in corresponding Korean Patent Application No. 10-2011-0005534. (w/partial English translation).

(Continued)

*Primary Examiner* — Lauren Nguyen
(74) *Attorney, Agent, or Firm* — Westerman, Hattori, Daniels & Adrian, LLP

(57) ABSTRACT

A system and a method for manufacturing a liquid crystal display element through a reduced number of steps are provided, in which a liquid crystal panel is turned over, by means of a panel turning mechanism, about an axis not parallel to any of the long and short sides of the liquid crystal panel so that the positional relationship between the long and short sides of the liquid crystal panel can be reversed, after one of sheet pieces of optical functional films is bonded to the liquid crystal panel and before another of the sheet pieces is bonded thereto, which can achieve the same effect by a single operation as in the case where turning over the liquid crystal panel and rotating it are performed independently.

7 Claims, 12 Drawing Sheets

(56) References Cited

FOREIGN PATENT DOCUMENTS

| | | |
|---|---|---|
| EP | 2 434 316 A1 | 3/2012 |
| JP | 2004-250213 A | 9/2004 |
| JP | 2005-037417 A | 2/2005 |
| JP | 4307510 A | 8/2009 |
| JP | 4406043 B2 | 1/2010 |
| JP | 2011-002818 A | 1/2011 |
| TW | I307431 A1 | 3/2009 |
| WO | 2010/131677 A1 | 11/2010 |
| WO | 2010/134441 A1 | 11/2010 |
| WO | WO-2010-131677 | * 11/2010 |

OTHER PUBLICATIONS

Taiwanese Office Action dated Jun. 28, 2011, issued in corresponding Taiwanese Patent Application No. 099135470.

European Search Report dated Jun. 28, 2011, issued in corresponding European Patent Application No. 11155519.9.

European Office Action dated Jun. 7, 2013, issued in corresponding European Patent Application No. 11 155 519.9 (5 pages).

* cited by examiner

METHOD FOR MANUFACTURING A LIQUID CRYSTAL DISPLAY INCLUDING A LIQUID CRYSTAL DISPLAY PANEL TURNING OPERATION

BACKGROUND OF THE INVENTION

1. Field of the Invention

The invention relates to a system and a method for manufacturing a liquid crystal display element by bonding sheet pieces of optical functional films including polarizing films to both surfaces of a rectangular liquid crystal panel using first and second continuous rolls with different widths.

2. Description of the Related Art

A known example of a liquid crystal display manufacturing system as mentioned above is configured to turn over a substrate 1 to which a piece 19A of a long film 10A has been bonded and then to bond a piece 19B of another long film 10B to the substrate 1 (see for example Japanese Patent Application Laid-Open (JP-A) No. 2005-37417, paragraphs [0037] to [0044] and FIGS. 6 to 9).

On the other hand, even when rolls with different widths corresponding to the long and short sides of a rectangular liquid crystal panel are used, it is required to design a compact manufacturing line with lamination accuracy and function kept high. An attempt to meet this requirement is also proposed in which the liquid crystal panel is turned by 90° so that the manufacturing line can be linearly laid out (see for example Japanese Patent No. 4307510).

PRIOR ART LITERATURE

Patent Document

Patent Document 1: Japanese Patent Application Laid-Open (JP-A) No. 2005-37417

Patent Document 2: Japanese Patent No. 4307510 Publication

As mentioned above, a mechanism for turning over the liquid crystal panel and a mechanism for rotating it can be provided so that each optical functional film can be bonded from only one of the upper and lower sides in a linearly laid-out manufacturing line in the process of manufacturing a liquid crystal display element by bonding optical functional films to both sides of the liquid crystal panel.

In the production of liquid crystal displays, it is important not only to reduce the tact time for the purpose of increasing the production but also to avoid troubles during the manufacture because they are manufactured using a high level of technology. Unfortunately, when a mechanism for turning over the liquid crystal panel and a mechanism for rotating it are provided, there is a problem in which the turnover and rotation process requires a relatively long tact time, and a complicated apparatus and a multistep process are also required. The risk of troubles also increases with the increasing complexity, so that the manpower and time for production may be wasted. Currently, several thousand to several ten thousand liquid crystal displays have to be continuously produced per day, and therefore, a reduction in tact time and prevention of troubles are important to increase production rate.

SUMMARY OF THE INVENTION

The invention has been made under the circumstances described above, and an object of the invention is to provide a system and a method for manufacturing a liquid crystal display element, which can reduce the number of manufacturing steps. Another object of the invention is to provide a system and a method for manufacturing a liquid crystal display element, which can be achieved with a simplified apparatus. A further object of the invention is to provide a system and a method for manufacturing a liquid crystal display element, which make possible a reduction in tact time.

A system for manufacturing a liquid crystal display element according to the present invention relates to a system for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

a panel turning mechanism for turning over the liquid crystal panel after one of the sheet pieces is bonded to the liquid crystal panel and before another of the sheet pieces is bonded thereto, wherein the panel turning mechanism turns over the liquid crystal panel about an axis not parallel to any of long and short sides of the liquid crystal panel so that a positional relationship between the long and short sides of the liquid crystal panel can be reversed.

According to an embodiment of the invention, the liquid crystal panel is turned over about a single axis not parallel to any of the long and short sides of the liquid crystal panel so that the positional relationship between the long and short sides of the liquid crystal panel can be reversed, which can achieve the same effect by a single operation as in the case where turning over the liquid crystal panel and rotating it are performed independently. Therefore, the number of steps can be reduced, and the apparatus can be simplified. The tact time can also be reduced.

An another system for manufacturing a liquid crystal display element according to the present invention relates to a system for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

a panel turning mechanism for turning over the liquid crystal panel after one of the sheet pieces is bonded to the liquid crystal panel and before another of the sheet pieces is bonded thereto, wherein the panel turning mechanism turns over the liquid crystal panel about an axis not parallel to any of long and short sides of the liquid crystal panel so that a positional relationship between the long and short sides of the liquid crystal panel can be reversed.

The panel turning mechanism can turn over the liquid crystal panel about an axis inclined by 45° from a feed direction of the liquid crystal panel to a direction parallel to a surface of the liquid crystal panel.

According to an embodiment of the invention, the positional relationship between the long and short sides of the liquid crystal panel can be easily reversed only by turning over the liquid crystal panel about an axis inclined by 45° with respect to the feed direction. This allows further simplification of the apparatus and a further reduction in the tact time.

The panel turning mechanism can turn over the liquid crystal panel about an axis passing through a central portion of the liquid crystal panel.

According to an embodiment of the invention, it is possible to prevent horizontal displacement of the position of the center of the liquid crystal panel during the turnover of the liquid crystal panel. Therefore, there is no need to horizontally move or return the liquid crystal panel to the original position after the turnover, so that the tact time can be reduced accordingly.

The panel turning mechanism can shift the liquid crystal panel to a level different from the level where the liquid crystal panel is fed and then turns over the liquid crystal panel about an axis passing through the liquid crystal panel.

According to an embodiment of the invention, when turned over, the liquid crystal panel can be prevented from interfering with the liquid crystal panel-feeding line during the turnover of the liquid crystal panel. This feature of the invention is preferred particularly when the liquid crystal panel is turned over about an axis passing through the central portion of the liquid crystal panel as stated above, which would otherwise cause the liquid crystal panel to interfere with the liquid crystal panel-feeding line.

The panel turning mechanism can turn over the liquid crystal panel about an axis passing through a corner portion of the liquid crystal panel.

According to an embodiment of the invention, the liquid crystal panel can be prevented from interfering with the liquid crystal panel-feeding line during the turnover of the liquid crystal panel. Therefore, there is no need to vertically change the level of the liquid crystal panel before and after the turnover, so that the tact time can be reduced correspondingly.

According to this feature of the invention, the position of the central portion of the liquid crystal panel is horizontally shifted when the liquid crystal panel is turned over, but the time required to horizontally move and return the liquid crystal panel to the original position after the turnover can be reduced as much as possible when the liquid crystal panel is turned over about an axis passing through a corner portion of the liquid crystal panel, so that the tact time can be effectively reduced.

The panel turning mechanism can turn over the liquid crystal panel about an axis not passing through the liquid crystal panel.

According to an embodiment of the invention, the liquid crystal panel can be prevented from interfering with the liquid crystal panel-feeding line during the turnover of the liquid crystal panel. Therefore, there is no need to vertically change the level of the liquid crystal panel before and after the turnover, so that the tact time can be reduced correspondingly.

The liquid crystal panel can be fed along a linear feed path, and the panel turning mechanism can turn over the liquid crystal panel so that the liquid crystal panel is displaced from the feed path, and then transfers the liquid crystal panel onto the feed path.

According to an embodiment of the invention, a linear feed path can be formed for the liquid crystal panel so that a compact manufacturing line can be formed.

A method for manufacturing a liquid crystal display element according to the present invention relates to a method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

a panel turning step comprising turning over the liquid crystal panel after one of the sheet pieces is bonded to the liquid crystal panel and before another of the sheet pieces is bonded thereto, wherein in the panel turning step, the liquid crystal panel is turned over about an axis not parallel to any of long and short sides of the liquid crystal panel so that a positional relationship between the long and short sides of the liquid crystal panel can be reversed.

An another method for manufacturing a liquid crystal display element according to the present invention relates to a method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

a panel turning step comprising turning over the liquid crystal panel after one of the sheet pieces is bonded to the liquid crystal panel and before another of the sheet pieces is bonded thereto, wherein in the panel turning step, the liquid crystal panel is turned over about an axis not parallel to any of long and short sides of the liquid crystal panel so that a positional relationship between the long and short sides of the liquid crystal panel can be reversed.

In the panel turning step, the liquid crystal panel can be turned over about an axis inclined by 45° from a feed direction of the liquid crystal panel to a direction parallel to a surface of the liquid crystal panel.

In the panel turning step, the liquid crystal panel can be turned over about an axis passing through a central portion of the liquid crystal panel.

In the panel turning step, the liquid crystal panel can be shifted to a level different from the level where the liquid crystal panel is fed, and then turned over about an axis passing through the liquid crystal panel.

In the panel turning step, the liquid crystal panel can be turned over about an axis passing through a corner portion of the liquid crystal panel.

In the panel turning step, the liquid crystal panel can be turned over about an axis not passing through the liquid crystal panel.

The liquid crystal panel can be fed along a linear feed path, and in the panel turning step, the liquid crystal panel can be turned over so that the liquid crystal panel is displaced from the feed path, and then transferred onto the feed path.

DETAILED DESCRIPTION OF THE PREFERRED EMBODIMENTS

Figure 1:
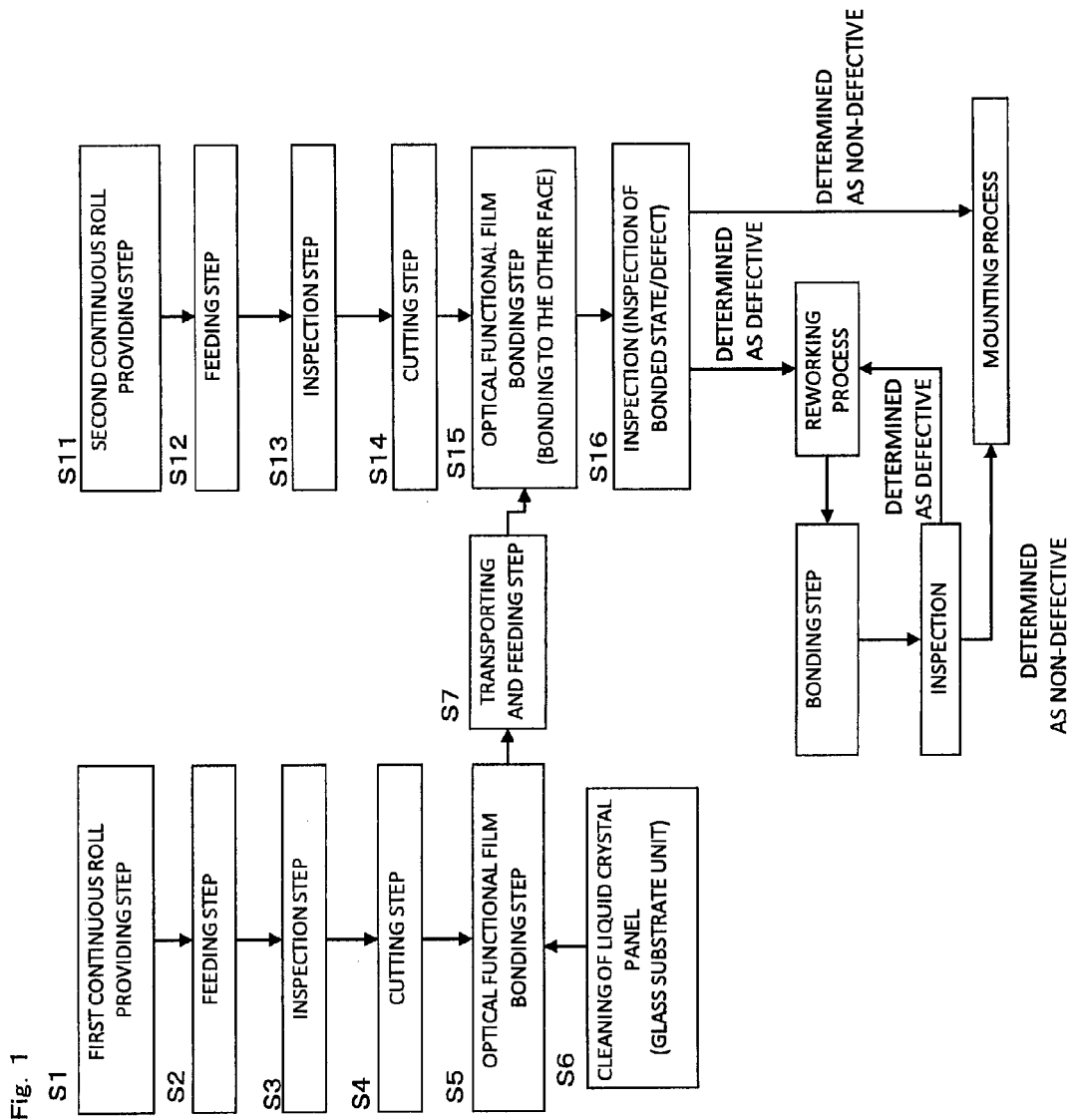
FIG. 1 is a flow chart showing an example of the liquid crystal display element manufacturing method according to an embodiment of the invention.
Figure 2:
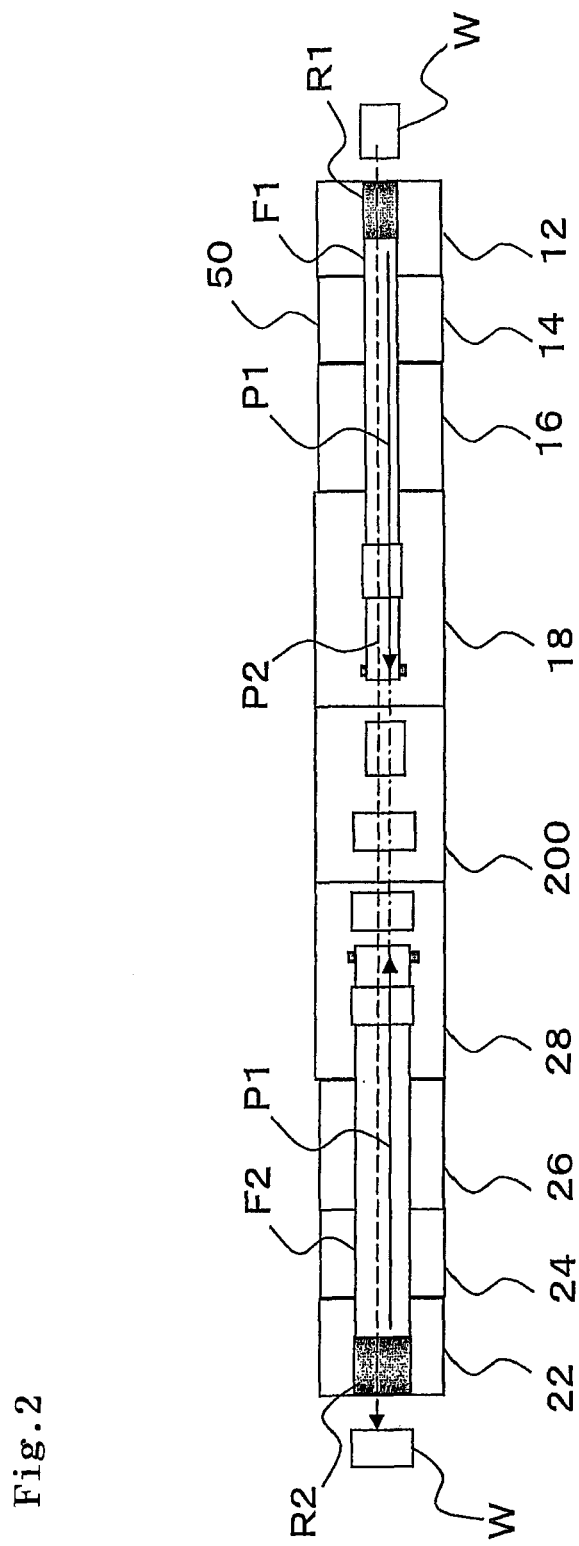
FIG. 2 is a schematic plan view showing an example of the liquid crystal display element manufacturing system.
Figure 3:
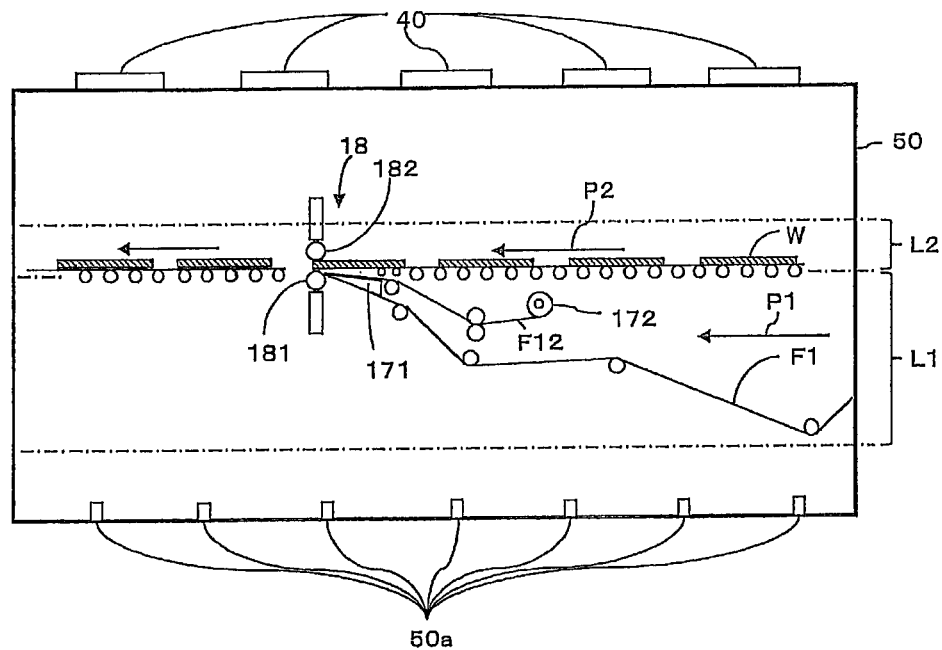
FIG. 3 is a schematic side view showing a process of bonding a first optical functional film to a liquid crystal panel.
Figure 4:
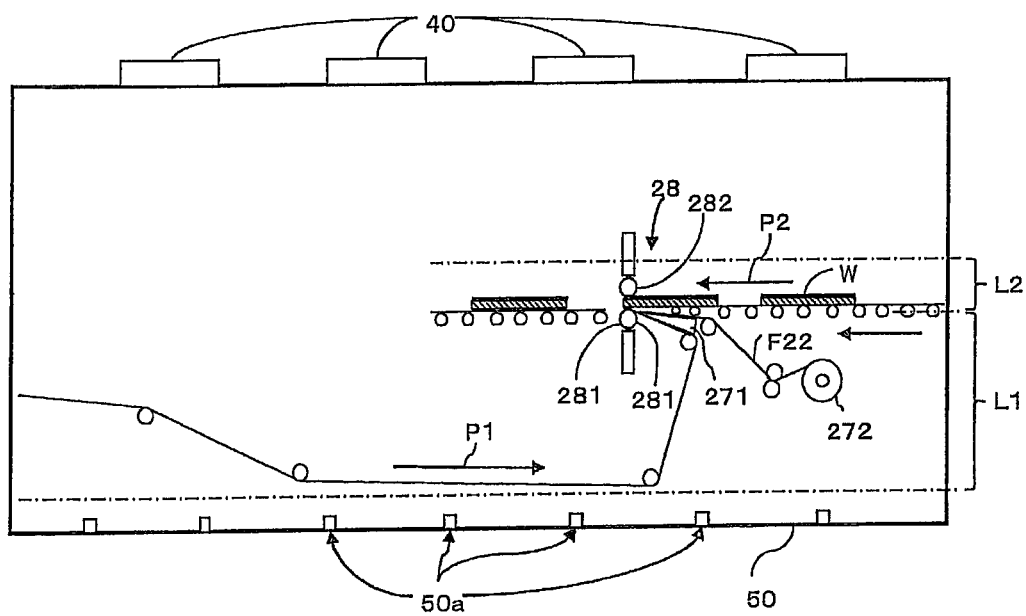
FIG. 4 is a schematic side view showing a process of bonding a second optical functional film to the liquid crystal panel.

FIG. 1 is a flow chart showing an example of the liquid crystal display element manufacturing method according to an embodiment of the invention. FIG. 2 is a schematic plan view showing an example of the liquid crystal display element manufacturing system. FIG. 3 is a schematic side view showing a process of bonding a first optical film F11 to a liquid crystal panel W. FIG. 4 is a schematic side view showing a process of bonding a second optical functional film F21 to the liquid crystal panel W.

Liquid Crystal Panel

The liquid crystal panel W for use in the liquid crystal display element manufactured according to the invention is typically a glass substrate unit including a pair of glass substrates and a liquid crystal placed therebetween. The liquid crystal panel W has a rectangular shape.

Optical Functional Film

The optical functional film for use in the liquid crystal display element manufactured according to the invention includes a polarizing film. A pressure-sensitive adhesive layer is formed on one side of the optical functional film so that it can be bonded to the liquid crystal panel W, and a carrier film for protecting the pressure-sensitive adhesive layer is also provided thereon. Namely, the optical functional film, the pressure-sensitive adhesive layer, and the carrier film are stacked in this order. A surface protecting film is provided on the other side of the optical functional film with a pressure-sensitive adhesive layer interposed therebetween. Hereinafter, the laminate of the surface protecting film, the optical functional film, and the carrier film is also referred to as an optical film laminate.

Figure 5:
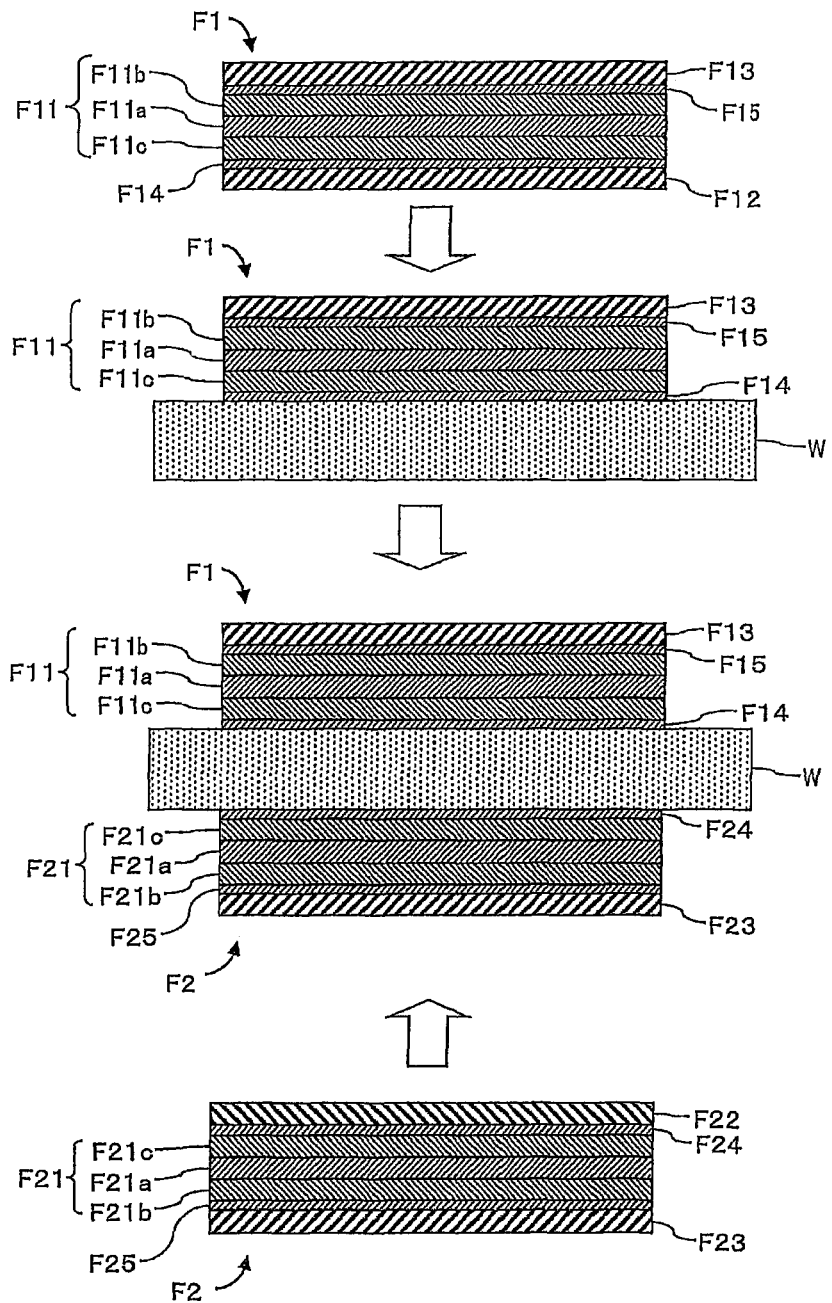
FIG. 5 is a schematic perspective view showing an example of the process of bonding optical functional films to a liquid crystal panel.

FIG. 5 is a cross-sectional view showing an example of the process of bonding the optical functional film to the liquid crystal panel W. In this embodiment, first and second optical film laminates F1 and F2 are used. The first optical film laminate F1 includes a first optical functional film F11 which is to be bonded to one surface of the liquid crystal panel W, and the second optical film laminate F2 includes a second optical functional film F21 which is to be bonded to the other surface of the liquid crystal panel W.

The first optical film laminate F1 has a structure in which the first optical functional film F11, a first carrier film F12 and a surface protecting film F13 are stacked. In this embodiment, the first optical functional film F11 includes a polarizing film. The first optical functional film F11 includes a first polarizer F11a, a first film F11b bonded to one side thereof with an adhesive layer (not shown) interposed therebetween, and a second film F11c bonded to the other side thereof with an adhesive layer (not shown) interposed therebetween. The first polarizer F11a is typically formed by stretching a polyvinyl alcohol (PVA) film. It will be understood that the first polarizer F11a may be formed using any other film than the polyvinyl alcohol film.

The first and second films F11b and F11c are each typically a protective film (such as a triacetylcellulose film or a PET film). The second film F11c will be bonded to the liquid crystal panel W with a first pressure-sensitive adhesive layer F14 interposed therebetween. The first film F11b may be subjected to a surface treatment. For example, the surface treatment may be a hard coating treatment, an antireflection treatment, or a treatment for any other purpose such as an anti-sticking, diffusion, or antiglare purpose. The first carrier film F12 is bonded to the second film F11c with the first pressure-sensitive adhesive layer F14 interposed therebetween. The surface protecting film F13 is bonded to the first film F11b with a pressure-sensitive adhesive layer F15 interposed therebetween.

The laminated structure of the second optical film laminate F2 is the same as, but not limited to, that of the first optical film laminate F1. The second optical film laminate F2 has a structure in which a second optical functional film F21, a second carrier film F22, and a surface protecting film F23 are stacked. In this embodiment, the second optical functional film F21 includes a polarizing film. The second optical functional film F21 includes a second polarizer F21a, a third film F21b bonded to one side thereof with an adhesive layer (not shown) interposed therebetween, and a fourth film F21c bonded to the other side thereof with an adhesive layer (not shown) interposed therebetween. The second polarizer F21a is typically formed by drying a polyvinyl alcohol (PVA) film. It will be understood that the second polarizer F21a may be formed using any other film than the polyvinyl alcohol film.

The third and fourth films F21b and F21c are each typically a protective film (such as a triacetylcellulose film or a PET film). The fourth film F21c will be bonded to the liquid crystal panel W with a second pressure-sensitive adhesive layer F24 interposed therebetween. The third film F21b may be subjected to a surface treatment. For example, the surface treatment may be a hard coating treatment, an antireflection treatment, or a treatment for any other purpose such as an anti-sticking, diffusion, or antiglare purpose. The second carrier film F22 is bonded to the fourth film F21c with the second pressure-sensitive adhesive layer F24 interposed therebetween. The surface protecting film F23 is bonded to the third film F21b with a pressure-sensitive adhesive layer F25 interposed therebetween.

Manufacturing Flow Chart (1) Step of Providing First Continuous Roll (S1 in FIG. 1). A first continuous roll R1 is provided which is formed by winding a first long optical film laminate F1 into a roll. The first continuous roll R1 has a width depending on the size of the liquid crystal panel W to be bonded. Specifically, the first continuous roll R1 is formed by winding, into a roll, a first optical film laminate F1 including a first optical functional film F11 with a width corresponding to the short or long side of the liquid crystal panel W. More specifically, the first continuous roll R1 is formed by winding, into a roll, the first long optical film laminate F1 that is obtained by slitting, into a width corresponding to the short or long side of the liquid crystal panel W, a long material including the first optical functional film F11, the first pressure-sensitive adhesive layer F14, and the first carrier film F12 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the first optical film laminate F1 formed can have an absorption axis extending along the longitudinal direction with high accuracy. In this embodiment, the first continuous roll R1 used has a width corresponding to the short side of the liquid crystal panel W.

(2) Step of Feeding First Optical Functional Film (S2 in FIG. 1). A first feeder 12 draws and feeds the first optical film laminate F1 including the first optical functional film F11 to the downstream side from the first continuous roll R1 provided and placed. The first optical film laminate F1 is fed from the first continuous roll R1 linearly in planar view.

(3) First Inspection Step (S3 in FIG. 1). The first optical film laminate F1 is inspected for defects using a first defect inspection apparatus 14. In this step, the defect inspection method may be a method of performing imaging and image processing on both sides of the first optical film laminate F1 with transmitted light or reflected light, a method of performing imaging and image processing with a polarizing film for inspection arranged in a crossed nicols relationship (also referred to as "0° cross") with the polarization axis of the polarizing film (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing film (the object to be inspected) between a CCD camera and the object. Known methods may be used for the image processing algorithm. For example, defects may be detected by grayscale determination based on binarization.

Defect information detected by the first defect inspection apparatus 14 is associated with the positional information (such as position coordinates) and sent to a controller so that it can contribute to the cutting process with a first cutting apparatus 16.

(4) First Cutting Step (S4 in FIG. 1). The first cutting apparatus 16 cuts, in the transverse direction, at least the first optical functional film F11 of the first optical film laminate F1 drawn from the first continuous roll R1, so that a sheet piece of the first optical functional film F11 is formed. In this example, while the first carrier film F12 is left uncut, the first optical functional film F11, to which the first carrier film F12 is attached, and the surface protecting film F13, to which the first optical functional film F11 is attached, are cut into a predetermined size. It will be understood that such a process is non-limiting, and alternatively, for example, the first optical film laminate F1 may be cut completely so that a piece of the first optical film laminate F1 can be formed. For example, the cutting means may be a laser, a cutter, or the like. The cutting is preferably performed based on the defect information detected by the first defect inspection apparatus 14 so that defects can be avoided. This significantly increases the first optical film laminate F1 yield. Defective parts of the first optical film laminate F1 are removed by a first removing apparatus (not shown) so as not to be bonded to the liquid crystal panel W. In this embodiment, the first optical functional film F11 is cut into a length corresponding to the long side of the liquid crystal panel W. Alternatively, however, it may be cut into a length corresponding to the short side of the liquid crystal panel W when the first continuous roll R1 has a width corresponding to the long side of the liquid crystal panel W.

All of the step of providing the first continuous roll, the first inspection step, and the first cutting step are preferably performed in a continuous manufacturing line. In the above series of manufacturing steps, a sheet piece of the first optical functional film F11 is formed, which is to be bonded to one surface of the liquid crystal panel W. A description is given below of a process of forming a sheet piece of the second optical functional film F21 to be bonded to the other surface of the liquid crystal panel W.

(5) Step of Providing Second Continuous Roll (S11 in FIG. 1). A second continuous roll R2 is provided which is formed by winding a second long optical film laminate F2 into a roll. The second continuous roll R2 has a width depending on the size of the liquid crystal panel W to be bonded. Specifically, the second continuous roll R2 is formed by winding, into a roll, a second optical film laminate F2 including a second optical functional film F21 with a width corresponding to the long or short side of the liquid crystal panel W. More specifically, the second continuous roll R2 is formed by winding, into a roll, the second long optical film laminate F2 that is obtained by slitting, into a width corresponding to the long or short side of the liquid crystal panel W, a long material including the second optical functional film F21, the second pressure-sensitive adhesive layer F24, and the second carrier film F22 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the second optical film laminate F2 formed can have an absorption axis extending along the longitudinal direction with high accuracy. The second continuous roll R2 is typically formed with a width different from that of the first continuous roll R1. Specifically, when the first continuous roll R1 is formed with a width corresponding to the long side of the liquid crystal panel W, the second continuous roll R2 is formed with a width corresponding to the short side of the liquid crystal panel W, and when the first continuous roll R1 is formed with a width corresponding to the short side of the liquid crystal panel W, the second continuous roll R2 is formed with a width corresponding to the long side of the liquid crystal panel W. In this embodiment, the second continuous roll R2 used has a width corresponding to the long side of the liquid crystal panel W. As used herein, the expression "corresponding to the long or short side of the liquid crystal panel W" means that the bonding length of the optical functional film F11 or F21 (exclusive of the length of the exposed portion) will correspond to the length of the long or short side of the liquid crystal panel W and is not necessary to mean that the width of the optical functional film F11 or F12 has to be equal to the length of the long or short side of the liquid crystal panel W.

(6) Step of Feeding Second Optical Functional Film (S12 in FIG. 1). A second feeder 22 draws and feeds the second optical film laminate F2 including the second optical functional film F21 to the downstream side from the second continuous roll R2 provided and placed. The second optical film laminate F2 is fed from the second continuous roll R2 linearly in planar view. More specifically, as shown in FIG. 2, the first and second optical film laminates F1 and F2 are fed from the first and second continuous rolls R1 and R2, respectively, on first linear feed paths P1 whose extended lines overlap each other in planar view (the film feeding step). The first and second optical film laminates F1 and F2 may be fed in directions opposite to each other or in the same direction on the first linear feed paths P1. In this embodiment, the liquid crystal display element manufacturing system includes film feeding line L1 that are arranged so that the first and second optical film laminates F1 and F2 being fed can be linearly aligned with each other in planar view as described above (see FIGS. 3 and 4).

(7) Second Inspection Step (S13 in FIG. 1). The second optical film laminate F2 is inspected for defects using a second defect inspection apparatus 24. In this step, the defect inspection method is the same as the above method with the first defect inspection apparatus 14. However, the first inspection step (S3) and the second inspection step (S13) may be omitted. In such a case, the first and second optical film laminates F1 and F2 may be inspected for defects in a stage where the first and second continuous rolls R1 and R2 are manufactured, and liquid crystal display elements may be manufactured using the first and second continuous rolls R1 and R2 to which the defect information detected by the defect inspection has been attached.

(8) Second Cutting Step (S14 in FIG. 1). A second cutting apparatus 26 cuts, in the transverse direction, at least the second optical functional film F21 of the second optical film laminate F2 drawn from the second continuous roll R2, so that a sheet piece of the second optical functional film F21 is formed. In this example, while the second carrier film F22 is left uncut, the second optical functional film F21, to which the second carrier film F22 is attached, and the surface protecting film F23, to which the second optical functional film F21 is attached, are cut into a predetermined size. It will be understood that such a process is non-limiting, and alternatively, for example, the second optical film laminate F2 may be cut completely so that a piece of the second optical film laminate F2 can be formed. For example, the cutting means may be a laser, a cutter, or the like. The cutting is preferably performed based on the defect information detected by the second defect inspection apparatus 24 so that defects can be avoided. This significantly increases the second optical film laminate F2 yield. Defective parts of the second optical film laminate F2 are removed by a second removing apparatus (not shown) so as not to be bonded to the liquid crystal panel W. In this embodiment, the second optical functional film F21 is cut into a length corresponding to the short side of the liquid crystal panel W. Alternatively, however, it may be cut into a length corresponding to the long side of the liquid crystal panel W when the second continuous roll R2 has a width corresponding to the short side of the liquid crystal panel W.

The step of feeding the liquid crystal panel W is performed in parallel with the step of forming sheet pieces of the first and second optical functional films F11 and F21, respectively. The liquid crystal panel W is subjected to the process described below while it is fed.

(9) Cleaning Step (S6 in FIG. 1). The surface of the liquid crystal panel W is cleaned by polishing cleaning, washing with water, or any other cleaning method. As shown in FIGS. 3 and 4, the liquid crystal panel W having undergone cleaning is fed on a second linear feed path P2 in a panel feeding line L2 that is placed above the film feeding line L1 in an overlapping manner and placed to feed the liquid crystal panels W linearly in planar view (the panel feeding step). The second linear feed path P2 extends at least between first and second bonding apparatuses 18 and 28 and placed parallel to the first linear feed paths P1 so as to at least partially overlap with the first linear feed paths P1 in planar view.

(10) Step of Bonding First Optical Functional Film (S5 in FIG. 1). The cut piece of the first optical functional film F11 (the sheet piece of the first optical functional film F11) is bonded to one surface of the liquid crystal panel W with the pressure-sensitive adhesive layer F14 interposed therebetween by the first bonding apparatus 18, while the first carrier film F12 is peeled off. The first carrier film F12 peeled off by a peeling unit 171 is wound onto a roll 172. In the bonding, the first optical functional film F11 and the liquid crystal panel W are inserted and press-bonded between a pair of rollers 181 and 182 opposed to each other.

(11) Step of Transporting and Feeding Panel (S7 in FIG. 1). The liquid crystal panel W to which the sheet piece of the first optical functional film F11 has been bonded by the first bonding apparatus 18 is fed to a second bonding apparatus 28 along the second linear feed path P2. The panel feeding line L2 is provided with a panel turning mechanism 200 for turning over the liquid crystal panel W after the sheet piece of the first optical functional film F11 is bonded thereto and before a sheet piece of the second optical functional film F21 is bonded thereto. The panel turning mechanism 200 turns over the liquid crystal panel W so that the positional relationship between the long and short sides of the liquid crystal panel W can be reversed (the step of turning over the panel). Specifically, the long side of the liquid crystal panel W after the turnover is parallel to the short side before the turnover, and the short side of the liquid crystal panel W after the turnover is parallel to the long side before the turnover. The panel turning mechanism 200 turns over the liquid crystal panel W and rotates it horizontally by 90° to allow the first and second optical functional films F11 and F21 to be bonded in a crossed nicols relationship (in such a relationship that the absorption axes of the polarizing films are perpendicular to each other) to the liquid crystal panel W.

In the embodiment described above, the liquid crystal panel W is turned over after the first optical functional film F11 is bonded thereto in the first bonding apparatus 18. Alternatively, however, the second optical functional film F21 may be bonded to the liquid crystal panel W before the first optical functional film F11 is bonded thereto as mentioned above. In such a case, the liquid crystal panel W may be turned over after the second optical functional film F21 is bonded thereto in the second bonding apparatus 28.

(12) Step of Bonding Second Optical Functional Film (S15 in FIG. 1). The cut piece of the second optical functional film F21 (the sheet piece of the second optical functional film F21) is bonded to the other surface of the liquid crystal panel W with the pressure-sensitive adhesive layer F24 interposed therebetween by the second bonding apparatus 28, while the second carrier film F22 is peeled off. The second carrier film F22 peeled off by a peeling unit 271 is wound onto a roll 272. In the bonding, the second optical functional film F21 and the liquid crystal panel W are inserted and press-bonded between a pair of rollers 281 and 282 opposed to each other.

(13) Step of Inspecting Liquid Crystal Panel (S16 in FIG. 1). The liquid crystal panel W with both surfaces bonded to the optical functional films F11 and F12 is inspected using an inspection apparatus. An example of the inspection method is a method of performing imaging and image processing on both sides of the liquid crystal panel W with transmitted light and reflected light. Another example of the method uses a polarizing film for inspection placed between a CCD camera and the object to be inspected. Known methods may be used for the image processing algorithm. For example, defects may be detected by grayscale determination based on binarization.

(14) Defect information detected by the inspection apparatus is used to determine whether the liquid crystal panel W is non-defective. The liquid crystal panel W determined to be non-defective is transferred to the next implementing step. When determined to be defective, it is subjected to a reworking process, in which a new optical functional film F11 or F21 is bonded, and then the product is inspected. The product determined to be non-defective is transferred to the implementing step, but the product determined to be defective is subjected to the reworking process again or to disposal.

In the above series of manufacturing steps, the first optical functional film F11 bonding step and the second optical functional film F21 bonding step may be performed in a continuous manufacturing line, which makes it possible to manufacture the liquid crystal display element in a satisfactory manner.

A description has been given of a method that includes leaving the carrier films F12 and F22 uncut and cutting other components of the optical film laminates F1 and F2 (half-cutting method). However, such a method is non-limiting, and alternatively, for example, continuous rolls having undergone half-cutting may be used, in which sheet pieces of the optical functional films F11 and F21 formed by previously cutting the other components of the optical film laminates F12 and F22 than the carrier films F12 and F22 are held on the carrier films F12 and F22, respectively. In this case, the continuous rolls may be formed by a process that includes slitting a long material into a width corresponding to the short or long side of the rectangular liquid crystal panel W, cutting the optical functional films F11 and F21 and the pressure-sensitive adhesive layers F14 and F24 of the resulting long optical film laminates F1 and F2, respectively, into a length corresponding to the long or short side of the liquid crystal panel W, while leaving the carrier films F12 and F22 uncut, and winding, into rolls, the laminates F1 and F2 having undergone the cutting, respectively. The optical film laminates F1 and F2 are drawn from such continuous rolls, respectively, and the sheet pieces of the optical functional films F11 and F21 are bonded to the surfaces of the liquid crystal panel W with the pressure-sensitive adhesive layers F14 and F24 interposed therebetween, respectively, while the carrier films F12 and F22 are peeled off, so that a liquid crystal display element is manufactured. The optical functional films F11 and F21 do not always have to be bonded after they are cut, and the cutting may be performed during or after the bonding.

In this embodiment, air circulation apparatuses 40 for circulating air in the partition structure 50 are provided at the top of the partition structure 50. In this embodiment, the air circulation apparatuses 40 blow air into the partition structure 50, and the blown air is allowed to flow from the upper side to the lower side in the partition structure 50 and discharged from openings 50a formed at the bottom of the partition structure 50. Thus, the air is circulated in the partition structure 50 to keep the inside of the partition structure 50 clean.

Figure 6:
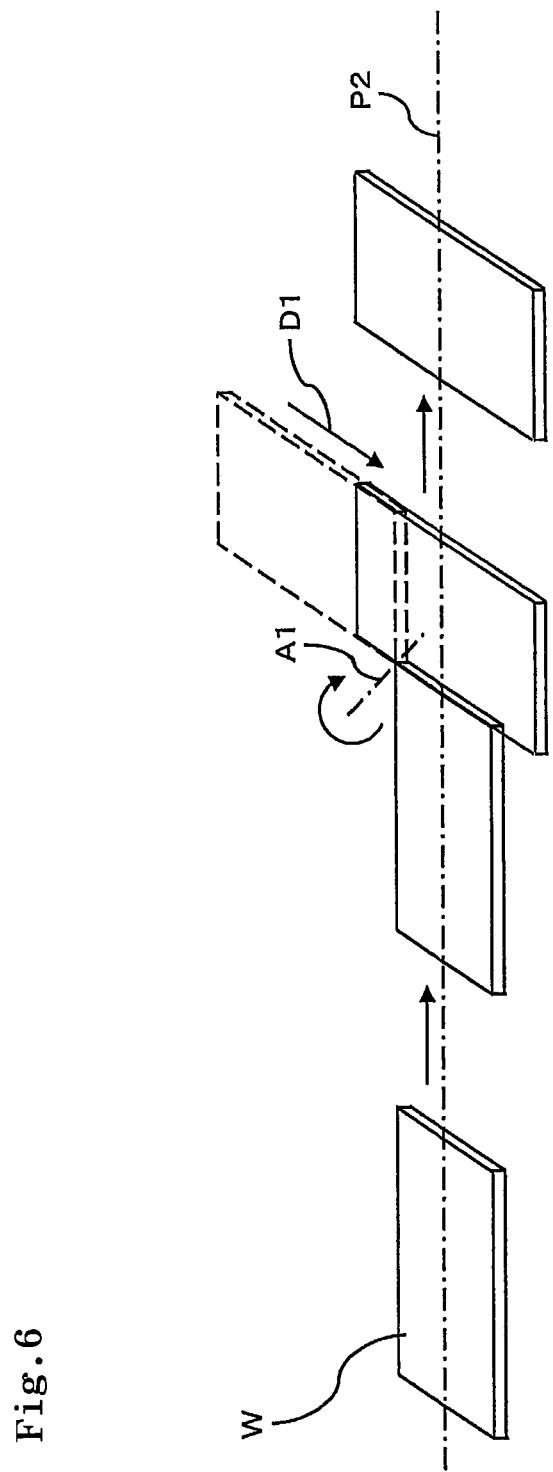
FIG. 6 is a schematic perspective view showing an example of the method of turning over a liquid crystal panel using a panel turning mechanism.
Figure 7:
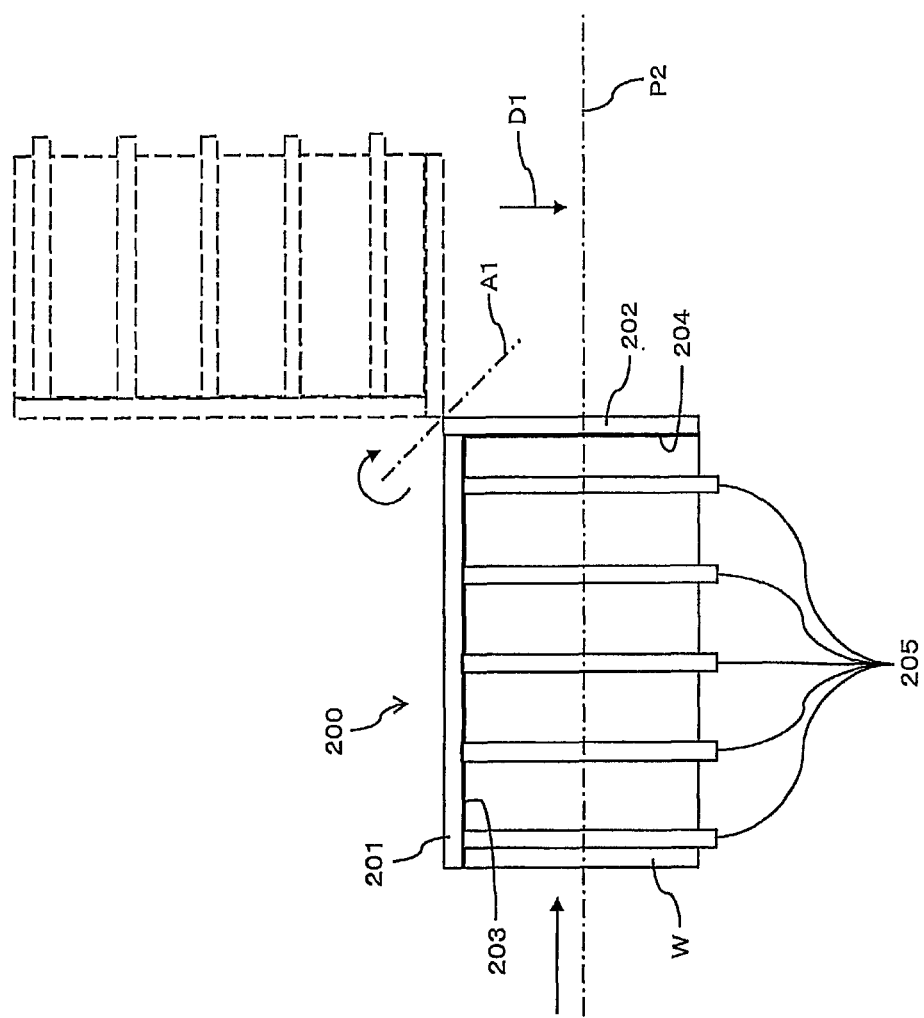
FIG. 7 is a schematic plan view showing an example of the panel turning mechanism.

FIG. 6 is a schematic perspective view showing an example of the method of turning over the liquid crystal panel W using the panel turning mechanism 200. FIG. 7 is a schematic plan view showing an example of the panel turning mechanism 200. It will be understood that the structure of the panel turning mechanism 200 is not limited to that shown in FIG. 7 and, any of various other structures may be used to form the panel turning mechanism 200.

In this embodiment, the liquid crystal panel W is turned over about a single axis A1 that is not parallel to any of the long and short sides of the liquid crystal panel W. The axis A1 is inclined by 45° from the direction of feeding of the liquid crystal panel W along the second linear feed path P2 to the direction parallel to the surface of the liquid crystal panel W.

As shown in FIG. 7, for example, the panel turning mechanism 200 has a long side-supporting part 201 for supporting at least one long side of the liquid crystal panel W and a short side-supporting part 202 for supporting at least one short side of the liquid crystal panel W. In this embodiment, the long side-supporting part 201 is configured to support only one long side of the liquid crystal panel W, and the long side-supporting part 201 is formed with a long side contact part 203 to be in contact with the long side of the liquid crystal panel W. In this embodiment, the short side-supporting part 202 is configured to support only one short side of the liquid crystal panel W, and the short side-supporting part 202 is formed with a short side contact part 204 to be in contact with the short side of the liquid crystal panel W. It will be appreciated that the long side-supporting part 201 may be configured to support both long sides of the liquid crystal panel W or the short side-supporting part 202 may be configured to support both short sides of the liquid crystal panel W.

According to this embodiment, when the liquid crystal panel W is turned over about the axis A1 not parallel to any of the long and short sides of the liquid crystal panel W with both of the long and short sides of the liquid crystal panel W being supported, the weight of the liquid crystal panel W can be dispersed to both of the long and short sides of the liquid crystal panel W for the reversal of the positional relationship between the long and short sides of the liquid crystal panel W. Therefore, the liquid crystal panel W is less likely to suffer from cracking or chipping, and the liquid crystal panel W can be turned over and rotated state in a more satisfactory manner.

Particularly in this embodiment, the long and short sides of the liquid crystal panel W can be aligned at the same time, because the long and short sides of the liquid crystal panel W are brought into contact with the long and short side contact parts 203 and 204, respectively. Therefore, even if the long and short sides of the liquid crystal panel W being transported are misaligned, the long and short sides of the liquid crystal panel W can be aligned by bringing them into contact with the long and short side contact parts 203 and 204, respectively. Thus, the directions of the long and short sides of the liquid crystal panel W can be aligned with higher accuracy with respect to the feed direction, so that the optical functional films F11 and F21 can be bonded to the liquid crystal panel W with improved accuracy.

As shown in the example in FIG. 7, the panel turning mechanism 200 preferably has both surface-contact parts 205 to be in contact with at least part of both surfaces of the liquid crystal panel W. According to this feature, the liquid crystal panel W can be held in a favorable manner with both surfaces thereof being in contact with the both surface-contact part 205 and turned over in a stable manner. In this example, a plurality of both surface-contact parts 205 are formed to extend parallel to one another on both one and the other surface sides of the liquid crystal panel W so that part of each surface can be in contact with the both surface-contact part 205. It will be understood that such a structure is non-limiting and any of various other structures may be used for the both surface-contact part 205. For example, the both surface-contact part 205 may be configured to be in contact with the whole of at least one surface of the liquid crystal panel W.

In the example shown in FIG. 6, the liquid crystal panel W is turned over about an axis A1 passing through a corner portion of the liquid crystal panel W. For example, the axis A1 is defined to pass through the corner portion located downstream of the feed direction of the liquid crystal panel W.

According to this feature, in the feed direction, the center of the liquid crystal panel W after the turnover is located downstream of the center of the liquid crystal panel W before the turnover, and the liquid crystal panel W does not go back when turned over. The corner portion is intended to include not only a corner (vertex) of the liquid crystal panel W but also an area ranging within a predetermined distance from the corner.

When the liquid crystal panel W is turned over by such a method, the liquid crystal penal W is positioned out of the second linear feed path P2 as shown by the broken lines in FIG. 6 after the turnover. Therefore, as indicated by the arrow D1 in FIG. 6, the liquid crystal panel W is preferably transferred onto the second linear feed path P2 after the turnover. According to this feature, a linear feed path can be formed for the liquid crystal panel W so that a compact manufacturing line can be formed. Alternatively, after the turnover, the liquid crystal panel W may be fed parallel to the second linear feed path P2 without being returned onto the second linear feed path P2. In this case, since there is no need to return the liquid crystal panel W to the second linear feed path P2, the tact time can be reduced correspondingly.

In this example, the liquid crystal panel W is turned over about the axis A1 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A1 inclined by 45° with respect to the feed direction. This allows further simplification of the apparatus and a further reduction in the tact time.

Also when the liquid crystal panel W is turned over about the axis A1 passing through a corner portion of the liquid crystal panel W, the liquid crystal panel W can be prevented from interfering with the liquid crystal panel W-feeding line (such as a feeding mechanism including components of the panel feeding line L2, such as rollers) during the turnover of the liquid crystal panel W. Therefore, since there is no need to vertically change the level of the liquid crystal panel W before and after the turnover, the tact time can be reduced correspondingly.

The reduction in the tact time is described with reference to Tables 1 and 2 below. Table 1 shows an example of how long it takes to perform each step when turning over the liquid crystal panel W and rotating it are performed independently. Table 2 shows an example of how long it takes to perform each step when the liquid crystal panel W is turned over in the manner shown in FIG. 6.

TABLE 1

| Steps | Time (sec) |
| --- | --- |
| Stopping the feeding of panel | 0 |
| Suction | 0.3 |
| Elevating panel | 1 |
| Rotating panel | 1.2 |
| Lowering panel | 0.8 |
| Moving arm | 0.6 |
| Catching | 0.8 |
| Elevating | 1 |
| Turning over | 2.8 |
| Lowering | 0.8 |

TABLE 1-continued

| Steps | Time (sec) |
| --- | --- |
| Releasing the catch | 0.8 |
| Returning arm | 0.6 |
| Total time | 10.7 |
| Pieces manufactured per day | 5400 |

TABLE 2

| Steps | Time (sec) |
| --- | --- |
| Stopping the feeding of panel | 0 |
| Moving arm | 0.6 |
| Catching | 0.8 |
| Turning over | 2.8 |
| Transferring onto feed path | 0.6 |
| Releasing the catch | 0.8 |
| Returning arm | 0.6 |
| Total time | 6.2 |
| Pieces manufactured per day | 9400 |

Table 1 shows that when turning over the liquid crystal panel W and rotating it are performed independently, the process requires time (0.3 seconds) to suck the surface of the liquid crystal panel W for rotation by means of a suction apparatus, time (1 second) to elevate the liquid crystal panel W to a position where it does not interfere with the feeding line during rotation after the suction, time (1.2 seconds) to rotate the liquid crystal panel W, and time (0.8 seconds) to lower the liquid crystal panel W onto the feeding line after the rotation, and the process subsequently requires time (0.6 seconds) to move a turnover arm to the position of the liquid crystal panel W, time (0.8 seconds) to catch the liquid crystal panel W in the arm, time (1 second) to elevate the liquid crystal panel W caught therein to a position where it does not interfere with the feeding line during turnover, time (2.8 seconds) to turn over the liquid crystal panel W, time (0.8 seconds) to lower the liquid crystal panel W onto the feeding line after the turnover, time (0.8 seconds) to release the catch of the liquid crystal panel W, and time (0.6 seconds) to move the arm to the original position. When turning over the liquid crystal panel W and rotating it are performed independently in this manner, the process requires a time of 10.7 seconds from the start to the end of the operation (the tact time of the turnover and rotation), and for example, 5,400 liquid crystal display elements can be manufactured per day.

In contrast, Table 2 shows that when the liquid crystal panel W is turned over in the manner shown in FIG. 6, the process requires time (0.6 seconds) to move the arm (panel turning mechanism 200) to the position of the liquid crystal panel W, time (0.8 seconds) to catch the liquid crystal panel W in the arm, time (2.8 seconds) to turn over the liquid crystal panel W caught therein, time (0.6 seconds) to return the liquid crystal panel W onto the second linear feed path P2 after the turnover, time (0.8 seconds) to release the catch of the liquid crystal panel W, and time (0.6 seconds) to move the arm to the original position. When the liquid crystal panel W is turned over about the axis A1 in this manner so that the positional relationship between the long and short sides of the liquid crystal panel W can be reversed, the time from the start to the end of the operation (the tact time of the turnover) is reduced to 6.2 seconds, and for example, 9,400 liquid crystal display elements can be manufactured per day.

In the configuration shown in this embodiment, the position of the center of the liquid crystal panel W is horizontally shifted when the liquid crystal panel W is turned over, but the time required to horizontally move and return the liquid crystal panel W to the original position after the turnover can be reduced as much as possible when the liquid crystal panel W is turned over about the axis A1 passing through a corner portion of the liquid crystal panel W, so that the tact time can be effectively reduced.

Figure 8:
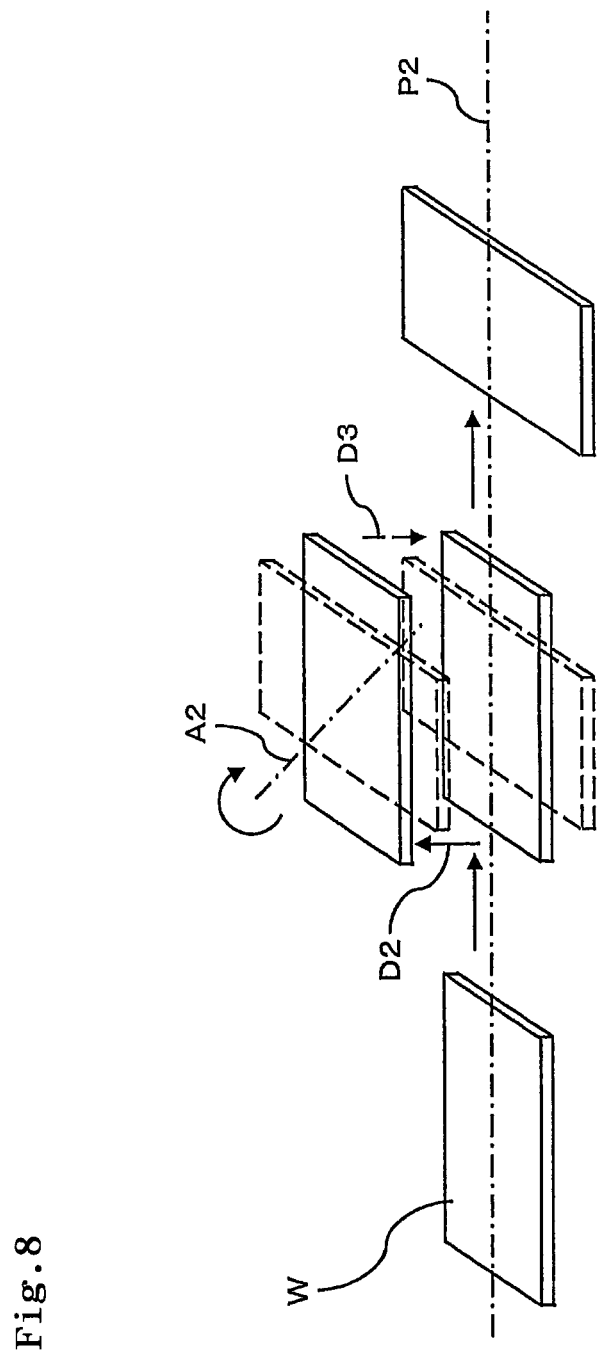
FIG. 8 is a schematic perspective view showing another example of the method of turning over a liquid crystal panel using a panel turning mechanism.

FIG. 8 is a schematic perspective view showing another example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A2 not parallel to any of the long and short sides of the liquid crystal panel W. The axis A2 is inclined by 45° from the direction of feeding of the liquid crystal panel W along the second linear feed path P2 to the direction parallel to the surface of the liquid crystal panel W.

In the example shown in FIG. 8, the liquid crystal panel W is turned over about the axis A2 passing through the central portion of the liquid crystal panel W. The axis A2 preferably passes through the center (the point of intersection of the two diagonal lines) of the liquid crystal panel W, but may pass through a position deviating by a predetermined distance from the center. In this example, the axis A2 passes through the central portion of the liquid crystal panel W, and therefore, as indicated by the broken lines in FIG. 8, the position of the liquid crystal panel W is not horizontally shifted from the second linear feed path P2 after the turnover, but to prevent the liquid crystal panel W from interfering with the feeding line (for example, the feeding mechanism including components of the panel feeding line L2, such rollers), the liquid crystal panel W is elevated (as indicated by the arrow D2 in FIG. 8) to a certain level different from the level at which the liquid crystal panel W is transported, and then the liquid crystal panel W is turned over about the axis A2 passing through the liquid crystal panel W, which is followed by lowering the liquid crystal panel W as indicated by the arrow D3.

In this example, the liquid crystal panel W is turned over about the axis A2 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A2 inclined by 45° with respect to the feed direction. This allows further simplification of the apparatus and a further reduction in the tact time.

It is also possible to prevent horizontal displacement of the position of the center of the liquid crystal panel W during the turnover of the liquid crystal panel W. Therefore, since there is no need to horizontally move or return the liquid crystal panel W to the original position after the turnover, the tact time can be reduced accordingly.

The reduction in the tact time is described with reference to Table 3 below. Table 3 shows an example of how long it takes to perform each step when the liquid crystal panel W is turned over in the manner shown in FIG. 8.

TABLE 3

| Steps | Time (sec) |
| --- | --- |
| Stopping the feeding of panel | 0 |
| Moving arm | 0.6 |
| Catching | 0.8 |
| Elevating | 1 |
| Turning over | 2.8 |
| Lowering | 0.8 |
| Releasing the catch | 0.8 |
| Returning arm | 0.6 |
| Total time | 7.4 |
| Pieces manufactured per day | 7900 |

Table 3 shows that when the liquid crystal panel W is turned over in the manner shown in FIG. 8, the process requires time (0.6 seconds) to move the arm (panel turning mechanism 200) to the position of the liquid crystal panel W, time (0.8 seconds) to catch the liquid crystal panel W in the arm, time (1 second) to elevate the liquid crystal panel W caught therein to a position where it does not interfere with the feeding line during the turnover, time (2.8 seconds) to turn over the liquid crystal panel W, time (0.8 seconds) to lower the liquid crystal panel W onto the feeding line after the turnover, time (0.8 seconds) to release the catch of the liquid crystal panel W, and time (0.6 seconds) to move the arm to the original position. When the liquid crystal panel W is turned over about the axis A2 in this manner so that the positional relationship between the long and short sides of the liquid crystal panel W can be reversed, the time from the start to the end of the operation (the tact time of the turnover) is reduced to 7.4 seconds, and for example, 7,900 liquid crystal display elements can be manufactured per day.

Figure 9:
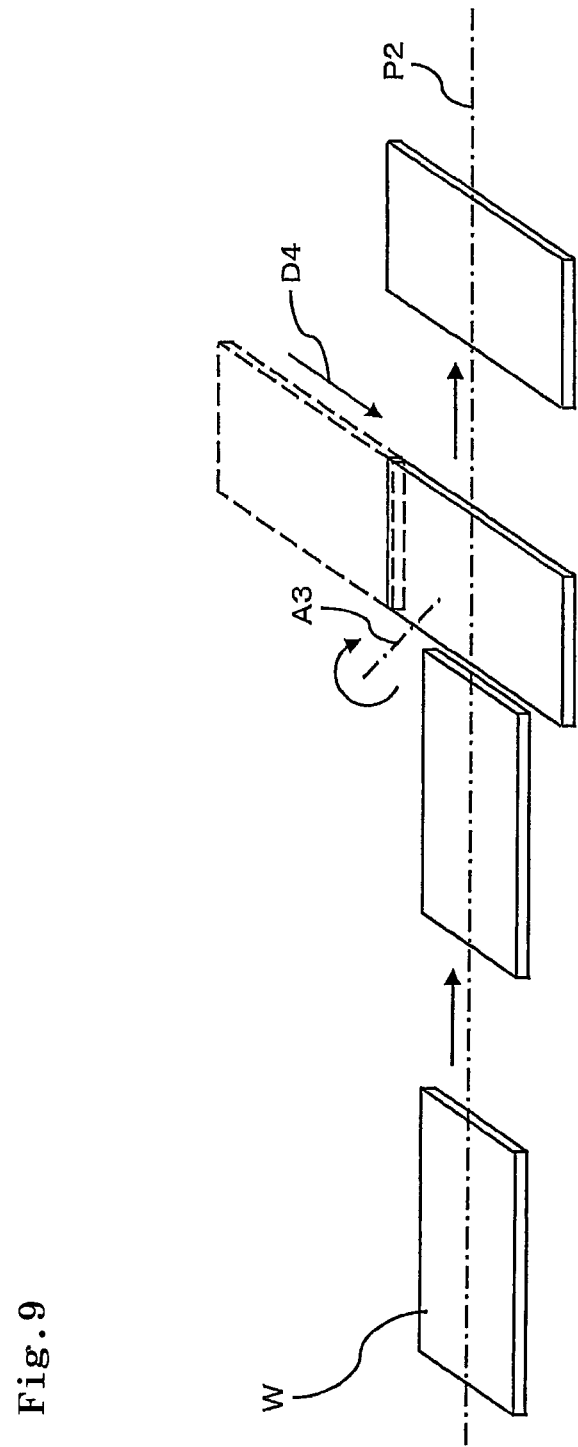
FIG. 9 is a schematic perspective view showing a further example of the method of turning over a liquid crystal panel using a panel turning mechanism.

FIG. 9 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about a single axis A3 that is not parallel to any of the long and short sides of the liquid crystal panel W. The axis A3 is inclined by 45° from the direction of feeding of the liquid crystal panel W along the second linear feed path P2 to the direction parallel to the surface of the liquid crystal panel W.

In the example shown in FIG. 9, the liquid crystal panel W is turned over about the axis A3 not passing through the liquid crystal panel W. The axis A3 preferably extends parallel to the surface of the liquid crystal panel W, more preferably extends in the same plane as the surface of the liquid crystal panel W. When the liquid crystal panel W is turned over by such a method, the liquid crystal penal W is positioned out of the second linear feed path P2 as shown by the broken lines in FIG. 9 after the turnover. Therefore, as indicated by the arrow D4 in FIG. 9, the liquid crystal panel W is preferably transferred onto the second linear feed path P2 after the turnover. According to this feature, a linear feed path can be formed for the liquid crystal panel W so that a compact manufacturing line can be formed. Alternatively, after the turnover, the liquid crystal panel W may be fed parallel to the second linear feed path P2 without being returned onto the second linear feed path P2. In this case, since there is no need to return the liquid crystal panel W to the second linear feed path P2, the tact time can be reduced correspondingly.

In this example, the liquid crystal panel W is turned over about the axis A3 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A3 inclined by 45° with respect to the feed direction. This allows further simplification of the apparatus and a further reduction in the tact time.

Also when the liquid crystal panel W is turned over about the axis A3 not passing through the liquid crystal panel W, the liquid crystal panel W can be prevented from interfering with the liquid crystal panel W-feeding line (such as a feeding mechanism including components of the panel feeding line L2, such as rollers) during the turnover of the liquid crystal panel W. Therefore, since there is no need to vertically change the level of the liquid crystal panel W before and after the turnover, the tact time can be reduced correspondingly. It should be noted that to reduce the tact time more effectively, the axis A3 is preferably as close to the liquid crystal panel W as possible.

The reduction in the tact time is described with reference to Table 4 below. Table 4 shows an example of how long it takes to perform each step when the liquid crystal panel W is turned over in the manner shown in FIG. 9.

TABLE 4

| Steps | Time (sec) |
| --- | --- |
| Stopping the feeding of panel | 0 |
| Moving arm | 0.6 |
| Catching | 0.8 |
| Turning over | 4.5 |
| Transferring onto feed path | 0.8 |
| Releasing the catch | 0.8 |
| Returning arm | 0.6 |
| Total time | 8.1 |
| Pieces manufactured per day | 7200 |

Table 4 shows that when the liquid crystal panel W is turned over in the manner shown in FIG. 9, the process requires time (0.6 seconds) to move the arm (panel turning mechanism 200) to the position of the liquid crystal panel W, time (0.8 seconds) to catch the liquid crystal panel W in the arm, time (4.5 seconds) to turn over the liquid crystal panel W, time (0.8 seconds) to return the liquid crystal panel W onto the second linear feed path P2 after the turnover, time (0.8 seconds) to release the catch of the liquid crystal panel W, and time (0.6 seconds) to move the arm to the original position. When the liquid crystal panel W is turned over about the axis A3 in this manner so that the positional relationship between the long and short sides of the liquid crystal panel W can be reversed, the time from the start to the end of the operation (the tact time of the turnover) is reduced to 8.1 seconds, and for example, 7,200 liquid crystal display elements can be manufactured per day.

Among the results shown above in Tables 1 to 4, Table 5 shows the tact time of the turnover (and rotation) and how many liquid crystal display elements can be manufactured per day.

TABLE 5

| | Tact time (sec) of turnover (and rotation) | Pieces manufactured per day |
| --- | --- | --- |
| Table 1 | 10.7 | 5400 |
| Table 2 | 6.2 | 9400 |
| Table 3 | 7.4 | 7900 |
| Table 4 | 8.1 | 7200 |

Referring to Table 5, 5,400 liquid crystal display elements can be manufactured per day when the turnover and the rotation are performed independently as shown in Table 1, whereas the number of liquid crystal display elements that can be manufactured per day can be increased by several thousands when the liquid crystal panel W is turned over as shown in Tables 2 and 3 so that the positional relationship between the long and short sides of the liquid crystal panel W can be reversed. Therefore, a certain number of products, which would otherwise be manufactured using two or more manufacturing lines by the conventional method shown in Table 1, can be manufactured using a single manufacturing line by each of the methods shown in Tables 2 to 4.

Figure 10:
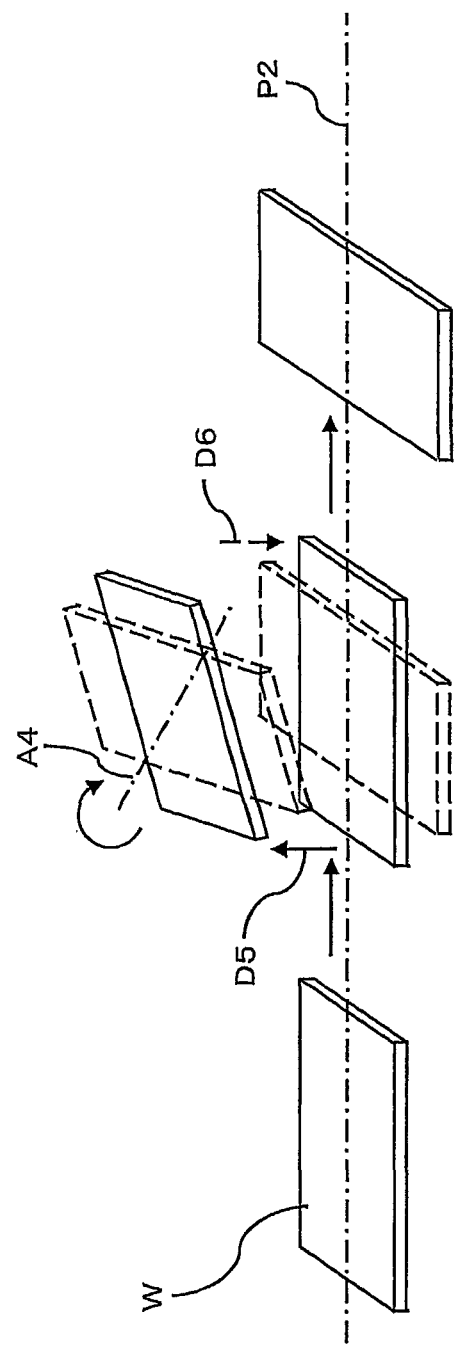
FIG. 10 is a schematic perspective view showing a further example of the method of turning over a liquid crystal panel using a panel turning mechanism.

FIG. 10 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A4 passing through the central portion of the liquid crystal panel W in a manner similar to that shown in FIG. 8, except that the liquid crystal panel W is not kept horizontal as shown in FIG. 8 when elevated but inclined with respect to the horizontal direction as indicated by the arrow D5 in FIG. 10 when elevated and that the liquid crystal panel W is turned over in the inclined state and then lowered as indicated by the arrow D6.

Figure 11:
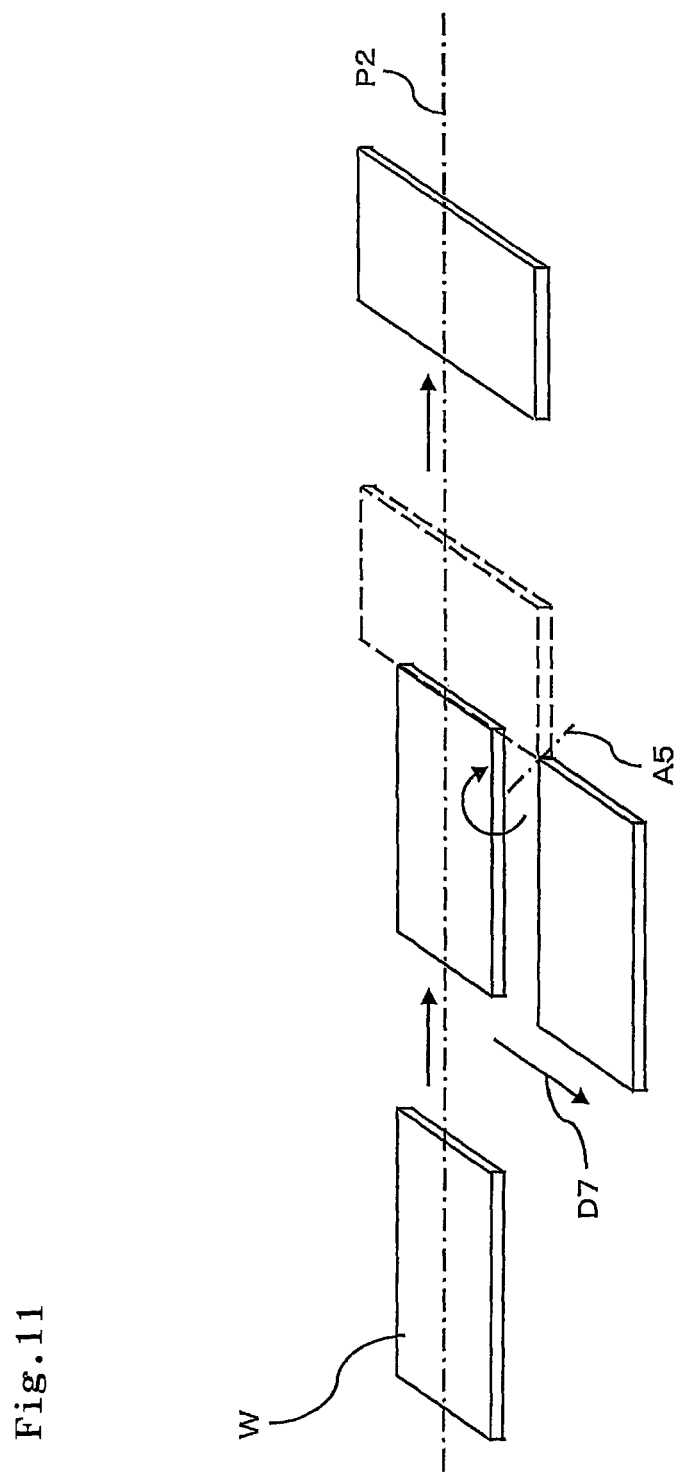
FIG. 11 is a schematic perspective view showing a further example of the method of turning over a liquid crystal panel using a panel turning mechanism.

FIG. 11 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A5 passing through a corner portion of the liquid crystal panel W in a similar manner to that shown in FIG. 6, except that the liquid crystal panel W is displaced from the second linear feed path P2 as indicated by the arrow D7 in FIG. 11 before the turnover and then turned over so that it can be transferred onto the second linear feed path P2, instead of the process shown in FIG. 6, which includes turning over the liquid crystal panel W so that it is displaced from the second linear feed path P2 and then transferring it onto the second linear feed path P2.

Figure 12:
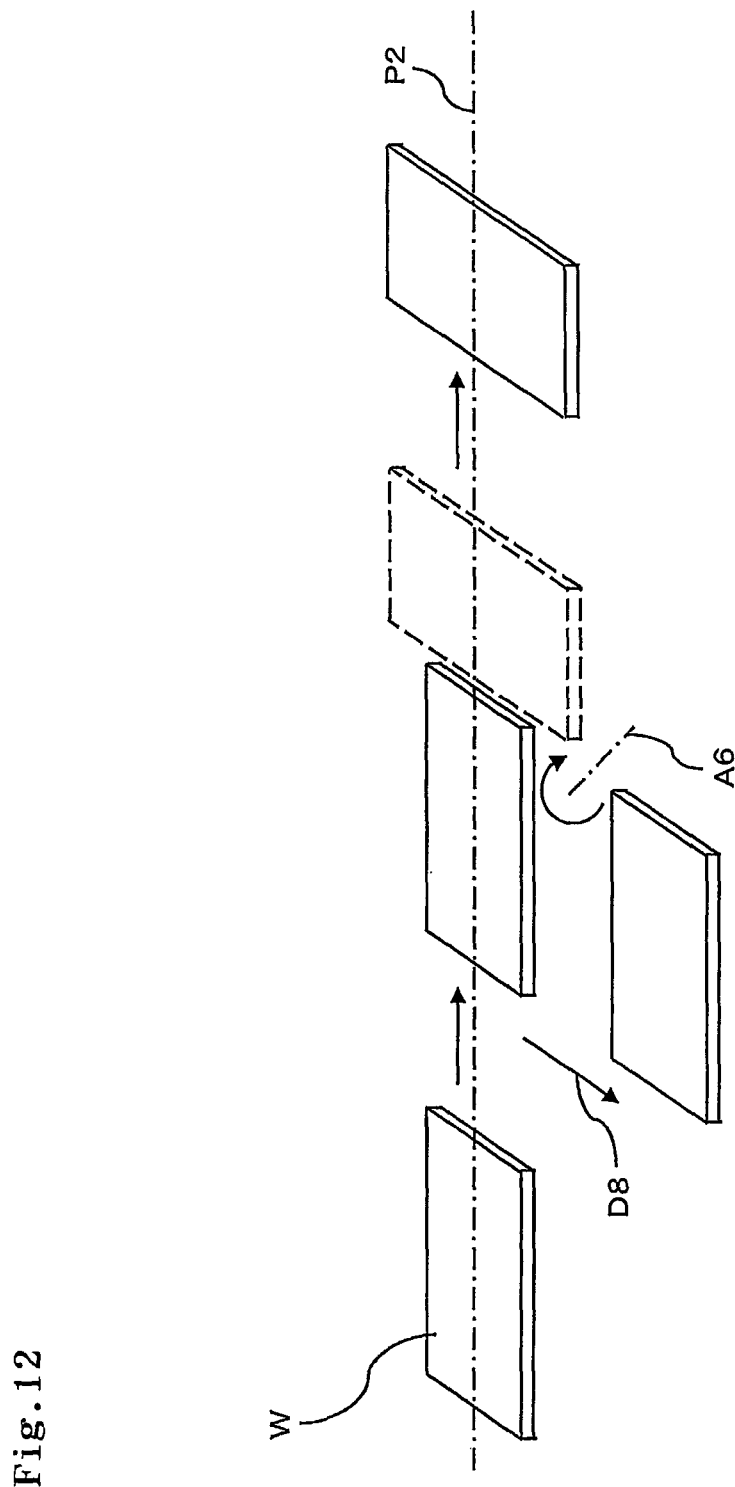
FIG. 12 is a schematic perspective view showing a further example of the method of turning over a liquid crystal panel using a panel turning mechanism.

FIG. 12 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A6 not passing through the liquid crystal panel W in a similar manner to that shown in FIG. 9, except that the liquid crystal panel W is displaced from the second linear feed path P2 as indicated by the arrow D8 in FIG. 12 before the turnover and then turned over so that it can be transferred onto the second linear feed path P2, instead of the process shown in FIG. 9, which includes turning over the liquid crystal panel W so that it is displaced from the second linear feed path P2 and then transferring it onto the second linear feed path P2.

Figure 13:
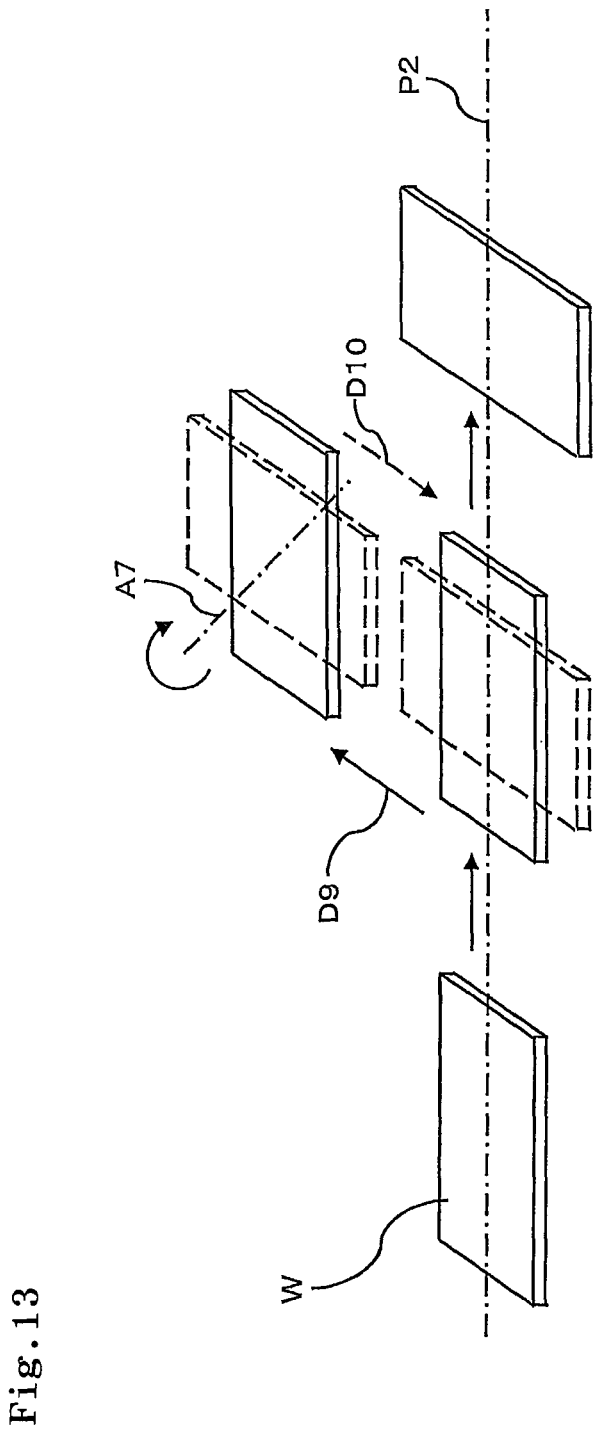
FIG. 13 is a schematic perspective view showing a further example of the method of turning over a liquid crystal panel using a panel turning mechanism.

FIG. 13 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A4 passing through the central portion of the liquid crystal panel W in a similar manner to that shown in FIG. 8, except that the liquid crystal panel W is not elevated as shown in FIG. 8 but horizontally moved to a position where it does not interfere with the feeding line (for example, a feeding mechanism including components of the panel feeding line L2, such rollers) as indicated by the arrow D9 in FIG. 13, turned over at that position, and then moved onto the linear feed path P2 as indicated by the arrow D10.

The above are mere examples of the method of turning over the liquid crystal panel W using the panel turning mechanism 200, and the liquid crystal panel W may be turned over in various other modes.

What is claimed is:

1. A method for manufacturing a liquid crystal display element by a process comprising feeding optical functional films from first and second continuous rolls with different widths, respectively, which are each formed by winding, into a roll, a long optical functional film comprising a polarizing film, transversely cutting the optical functional films into sheet pieces of the optical functional films, and bonding the sheet pieces to both surfaces of a rectangular liquid crystal panel, comprising:

a panel turning step comprising turning over the liquid crystal panel after one of the sheet pieces is bonded to the liquid crystal panel and before another of the sheet pieces is bonded thereto, wherein in the panel turning step, the liquid crystal panel is turned over about an axis not parallel to any of long and short sides of the liquid crystal panel so that a positional relationship between the long and short sides of the liquid crystal panel can be reversed, and wherein in the panel turning step, the liquid crystal panel is turned over about an axis inclined by 45° from a feed direction of the liquid crystal panel to a direction parallel to a surface of the liquid crystal panel.

2. A method for manufacturing a liquid crystal display element by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, comprising:

a panel turning step comprising turning over the liquid crystal panel after one of the sheet pieces is bonded to the liquid crystal panel and before another of the sheet pieces is bonded thereto, wherein in the panel turning step, the liquid crystal panel is turned over about an axis not parallel to any of long and short sides of the liquid crystal panel so that a positional relationship between the long and short sides of the liquid crystal panel can be reversed, and wherein in the panel turning step, the liquid crystal panel is turned over about an axis inclined by 45° from a feed direction of the liquid crystal panel to a direction parallel to a surface of the liquid crystal panel.

3. The method according to claim 1, wherein in the panel turning step, the liquid crystal panel is turned over about an axis passing through a central portion of the liquid crystal panel.

4. The method according to claim 1, wherein in the panel turning step, the liquid crystal panel is shifted to a level different from the level where the liquid crystal panel is fed, and then turned over about an axis passing through the liquid crystal panel.

5. The method according to claim 1, wherein in the panel turning step, the liquid crystal panel is turned over about an axis passing through a corner portion of the liquid crystal panel.

6. The method according to claim 1, wherein in the panel turning step, the liquid crystal panel is turned over about an axis not passing through the liquid crystal panel.

7. The method according to claim 5, wherein the liquid crystal panel is fed along a linear feed path, and in the panel turning step, the liquid crystal panel is turned over so that the liquid crystal panel is displaced from the feed path, and then transferred onto the feed path.

* * * * *

UNITED STATES PATENT AND TRADEMARK OFFICE
CERTIFICATE OF CORRECTION

PATENT NO. : 8,508,697 B2
APPLICATION NO. : 13/022977
DATED : August 13, 2013
INVENTOR(S) : Satoshi Hirata et al.

It is certified that error appears in the above-identified patent and that said Letters Patent is hereby corrected as shown below:

On the title page, item 75 Inventor's name:
Change

"Seiji Kondou"

To be

--Seiji Kondo--

Signed and Sealed this
Twenty-sixth Day of November, 2013

Margaret A. Focarino
*Commissioner for Patents of the United States Patent and Trademark Office*